3,669,650
PRODUCTION OF COPPER COMPOUNDS AND
COPPER METAL POWDER
Benjamin Elstein, 2 Fichman St., and Roman Fein,
8 Frenkel St., both of Ramat Aviv, Israel
No Drawing. Filed Mar. 26, 1970, Ser. No. 23,004
Claims priority, application Israel, Mar. 27, 1969,
31,921
Int. Cl. C22b 15/08; C01g 3/04, 3/06
U.S. Cl. 75—101
4 Claims

ABSTRACT OF THE DISCLOSURE

The present invention relates to a process for the production of copper compounds from copper cement, which comprises first at least partially oxidizing the copper cement and afterwards reacting the oxidized copper cement with hydrochloric acid. If desired, the thus obtained cuprous chloride is further reacted so as to convert it into other copper compounds. The reaction may be conducted in such manner that part of the copper cement is converted into high grade copper metal powder.

BACKGROUND OF THE INVENTION

Field of the invention

The present invention relates to a novel method for the conversion of copper cement into various copper compounds, such as cuprous chloride, cupric chloride, copper oxychloride. It is possible to obtain high grade copper metal powder.

Description of the prior art

Hitherto copper cement is used mainly for the production of metallic copper by conventional processes. Copper compounds are generally produced from metallic copper, and hitherto practically no copper compounds were produced directly from copper cement.

From U.S. Pat. No. 2,046,937 it is known that copper compounds can be produced from metallic copper by treating the metallic copper with a solution consisting essentially of water, cupric chloride and ammonium chloride. This solution contains advantageously hydrochloric acid.

From U.S. Pat. No. 2,586,579 it is known that copper scale, copper oxides resulting from the treatment of copper ores or metallic copper in a converter may all be utilized in a process wherein same are reacted with hydrochloric acid and water, the product being a mixture of cuprous and cupric chlorides.

According to the present invention, copper cement is oxidized by exposure to atmospheric oxygen, until a predetermined degree of oxidation is attained. The at least partially oxidized copper cement is utilized for the reaction according to the present invention, and it is reacted with hydrochloric acid, so as to obtain a product consisting mainly of cuprous chloride. This is obtained in the form of a fine powder and can be converted, if so desired, into other copper compounds. Copper oxychloride can be obtained by suspending the cuprous chloride in water and passing through the suspension a stream of air. Thus about two-thirds are converted into copper oxychloride and one third into cupric chloride, which are easily separated. The residue obtained after the initial reaction of the oxidized copper cement with hydrochloric acid can be utilized for the production of high grade copper powder.

DESCRIPTION OF THE PRESENT INVENTION

The present invention relates to the production of copper compounds and to the production of copper metal powder. According to the present invention copper cement is utilized for the production of a number of copper compounds and also for the production of copper powder of a high degree of purity.

Hitherto copper cement has been produced on a large scale, but as far as it is known to applicants, the copper cement is used for the production of metallic copper by conventional techniques. There is no direct conversion of copper cement to copper compounds, such as cuprous chloride, cupric chloride or copper oxychloride.

Copper cement of a predetermined degree of oxidation is utilized for the production of copper compounds and for the production of copper metal in powder form. The cement of predetermined degree of oxidation is reacted with hydrochloric acid, which may be generated in situ by reaching sulfuric acid with sodium chloride, with which it reacts readily, and the resulting product is either used as such or converted into other compounds.

It is possible to obtain copper cement of a predetermined degree of oxidation by the controlled storage of copper cement for a predetermined period of time while in an acidic environment and while being maintained in a moist state. The degree of oxidation is apparent from the copper content of the cement; the higher the degree of oxidation, the lower will be the copper content of the cement in weight-percent. The commercial copper cement contains various impurities, and especially varying amounts of silica, and iron.

Whereas copper powder or copper metal in other forms is but slightly attacked by sulfuric acid or by hydrochloric acid, according to the present invention there is provided a process according to which copper cement is first oxidized to a sufficient degree, and subsequently reacted directly with hydrochloric acid, to yield a product comprising mainly cuprous chloride ($Cu_2Cl_2$), possibly in admixture with some cupric chloride. The desired product, cuprous chloride, is obtained in substantially pure form in the form of a fine powder, and this can be converted if desired into other copper compounds.

According to a further feature of the present invention, substantially pure copper metal powder can be obtained by the process of the invention.

According to yet a further embodiment of the invention there is provided an advantageous novel process for the production of copper oxychloride. This compound is generally produced by first producing cuprous chloride, preparing an aqueous suspension of this compound, and passing air through the suspension, resulting in the conversion of two-thirds of the cuprous chloride into copper oxychloride, the remaining third being converted into cupric chloride. The produced copper oxychloride is filtered off, and the remaining cupric chloride can be reduced by the action of metallic copper to cuprous chloride, and again be partially converted to copper oxychloride, or it is possible to add a basic compound to the solution of cupric chloride, resulting in the precipitation of copper oxychloride.

For producing copper oxychloride, the oxidized copper cement is first converted into cuprous chloride, it is suspended in water, air is passed through the aqueous suspension of this compound to produce copper oxychloride which is filtered off, and to the remaining solution of cupric chloride, a further quantity of oxidized copper cement is added, and air passed through this reaction system at elevated temperature, resulting in the nearly quantitative conversion of all the copper salts into the desired copper oxychloride, the residue being a small quantity of copper powder and impurities.

When the oxidized copper cement is reacted with hydrochloric acid, the larger part of it is converted into cuprous chloride. This is obtained in the form of a fine powder, and it can easily be filtered off. After washing, this powder consists substantially of pure cuprous chloride. The residue of copper cement is washed with concentrated hydrochloric acid in order to dissolve any copper compound present, the residue of the copper cement is further washed with water till neutral, dried in a non-oxidizing atmosphere, lumps are disintegrated by passage through a mill and screened. Practically all the organic and inorganic impurities can thus be removed, and there is obtained a product comprising substantially pure copper powder.

According to yet a further aspect of this invention, there is provided a process for the production of cuprous oxide, which comprises preparing a suspension of cuprous chloride in water, adding thereto a basic compound, such as calcium carbonate or calcium oxide, and maintaining it for a few minutes at a temperature of about 70–90° C.

In the following the invention will be illustrated by way of a number of examples, which are to be construed in a non-limitative manner.

EXAMPLE 1

A layer of copper cement, 1.5 to 2.5 meters high, on a platform, obtained in the Timna copper mines, was left in the open during 6 weeks. The cement was turned over twice a week by a crane. During the entire period it was maintained in a moist state, the pH being about 5.0. After this period, an adequate degree of oxidation was attained, and the analysis of the partially oxidized copper cement was: copper 72.3%, iron 8.0%, silicate 3.4%, water 1.6%. (Percent by weight).

A one-liter beaker was charged with 350 ml. of 20% by weight hydrochloric acid and 100 g. of the copper cement were added with constant stirring. The temperature rose to about 50° C. The reaction ceased after about 3 minutes.

Practically all of the cement was reacted during this period of time. The resulting suspension was decanted and filtered off. At the bottom of the beaker there remained a small residue, consisting mainly of impurities. It weighed 4.5 g. and contained 3.4 g. silicates and about 1.1 g. organic matter and other impurities.

The cuprous chloride obtained was washed with water, dried in a vacuum oven and weighed. A crop of 112.0 g. cuprous chloride was obtained, the yield being about 99.5% calculated on the copper content of the cement.

The thus obtained cuprous chloride was suspended in 400 ml. of water, air was passed through the suspension by means of a sintered glass at a rate of flow of about one liter air per minute. The reaction mixture was maintained at about 80° C. by external heating with continuous stirring.

After about 4 hours the reaction was terminated. A crop of copper oxychloride was obtained, which was filtered off on a Buchner funnel. It comprised 84 g. of copper oxychloride, $3Cu(OH)_2 \cdot CuCl_2$, and the aqueous solution of cupric chloride was returned to the reaction vessel. A further quantity of 70 g. of partially oxidized copper cement was added, and air was passed through at the same rate and temperature with stirring. Periodically the formed copper oxychloride was filtered off and the reaction was continued. An additional quantity of 98 g. of copper oxychloride was obtained.

EXAMPLE 2

Copper cement was left in the open as in Example 1, but for a period of 2 weeks only. The copper cement underwent oxidation, but to a lesser degree. The copper cement had a copper content of 81.5%, it contained 5.4% iron, 3.2% silica and 1.4% water.

A 1 liter beaker was charged with 350 ml. of 20% hydrochloric acid and 100 g. of the oxidized cement was added with stirring. After working up as in Example 1, a yield of 61.5 g. cuprous chloride was obtained, purity about 99%. The residue of copper cement was washed with 25 ml. of 36% hydrochloric acid and afterwards with water till neutral. It was dried in a vacuum oven and weighed. A crop of 44.5 g. of copper powder which contained impurities was obtained. This was ground and passed through a 200 mesh sieve. A quantity of 28 g. of fine copper powder which passed through the sieve was obtained. It had an apparent density of 2.4 g./ml. and a copper content of over 99.5%.

EXAMPLE 3

A quantity of 400 g. copper cement was worked up as set out in Example 2. After disintegration of the powder by passage through a mill, a quantity of 68 g. remained on a 200 mesh sieve. This powder, containing impurities, was heated in an oven to about 500° C. during 15 minutes. A black powder, of cupric oxide and impurities was obtained. The quantity obtained was 80 g. containing 54 g. of copper.

The copper oxide powder was added to an aqueous solution of 400 ml., containing 37 g. of cupric chloride. The reaction mixture was heated to 80–90° C. with vigorous stirring and maintained at this temperature during 1 hour. After this time a green suspension of copper oxychloride was formed. This was filtered off on a Buchner funnel. The reaction was continued and copper oxychloride filtered off again. After filtering off three times, a quantity of 115.0 g. of copper oxychloride ($CuCl_2 \cdot 3Cu(OH)_2$), copper content 58.5% was obtained.

In the reaction vessel there remained a small quantity of unreacted cupric oxide.

EXAMPLE 4

80 g. of the black powder of 54 g. copper content which was obtained in Example 3 was dissolved in 320 ml. of 20% hydrochloric acid. The solution was filtered off. After evaporating, 145 g. high purity $CuCl_2 \cdot 2H_2O$ was obtained.

The residue of copper powder can be separated easily from the admixed impurities by conventional flotation.

What is claimed is:

1. A process for the conversion of copper cement into copper compounds, which comprises at least partially oxidizing the copper cement by exposing the copper cement in moist state and at an acidic pH to air and thereafter reacting the at least partially oxidized copper cement with hydrochloric acid so as to convert it into solid cuprous chloride.

2. A process as claimed in claim 1, wherein the solid cuprous chloride obtained is suspended in water and air is passed through the suspension at an elevated temperature so as to convert the starting material partially into solid copper oxychloride and partially into cupric chloride dissolved in said water, and separating the solid copper oxychloride from the aqueous solution.

3. A process as claimed in claim 2, wherein the formed solid copper oxychloride is filtered off, the aqueous solution of cupric chloride is returned to the reaction vessel, a further quantity of oxidized copper cement is added thereto and the reaction is continued by the further passage of air through the reaction mixture, formed copper oxychloride being periodically removed as it is formed.

4. A process as claimed in claim 1, wherein only part of the oxidized copper cement is converted into solid cuprous chloride, the residue is washed with hydrochloric acid and freed from impurities by grinding the dried product and by subsequent sieving, resulting in a high quality copper powder.

References Cited

UNITED STATES PATENTS

| | | | |
|---|---|---|---|
| 2,586,579 | 2/1952 | Supiro | 23—97 |
| 2,690,399 | 9/1954 | Hubbell | 23—147 X |
| 2,046,937 | 7/1936 | Curtin | 23—55 |
| 3,282,675 | 11/1966 | Parker | 75—117 X |
| 1,963,105 | 6/1934 | Swift | 23—147 |

L. DEWAYNE RUTLEDGE, Primary Examiner

G. T. OZAKI, Assistant Examiner

U.S. Cl. X.R.

23—55, 97, 147; 75—114, 117